United States Patent
Kozolchyk et al.

(10) Patent No.: US 9,419,841 B1
(45) Date of Patent: Aug. 16, 2016

(54) TOKEN-BASED SECURE DATA MANAGEMENT

(75) Inventors: Jonathan Kozolchyk, Seattle, WA (US); Darren E. Canavor, Redmond, WA (US); Jeffrey J. Fielding, Seattle, WA (US); Vaibhav Mallya, Seattle, WA (US); Darin Keith McAdams, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1173 days.

(21) Appl. No.: 13/171,672

(22) Filed: Jun. 29, 2011

(51) Int. Cl.
*H04L 29/00* (2006.01)
*H04L 29/06* (2006.01)

(52) U.S. Cl.
CPC ...................................... *H04L 29/06* (2013.01)

(58) Field of Classification Search
CPC . G06F 21/6254; G06F 21/6245; G06Q 20/40; G06Q 20/382; G06Q 20/02; H04L 63/08; H04L 63/0884; H04L 63/0807; H04L 2209/56
See application file for complete search history.

(56) References Cited

U.S. PATENT DOCUMENTS

| | | | | |
|---|---|---|---|---|
| 6,178,508 | B1* | 1/2001 | Kaufman | 713/183 |
| 7,783,745 | B1 | 8/2010 | Bhargava et al. | |
| 8,447,983 | B1* | 5/2013 | Beck et al. | 713/172 |
| 8,458,487 | B1* | 6/2013 | Palgon et al. | 713/185 |
| 8,495,243 | B2* | 7/2013 | Bellamy et al. | 709/238 |
| 2003/0033398 | A1 | 2/2003 | Carlson et al. | |
| 2004/0019571 | A1* | 1/2004 | Hurwitz | G06Q 20/06 705/65 |
| 2004/0091116 | A1 | 5/2004 | Staddon et al. | |
| 2004/0139162 | A1 | 7/2004 | Adams et al. | |
| 2004/0153451 | A1* | 8/2004 | Phillips et al. | 707/8 |
| 2004/0210633 | A1 | 10/2004 | Brown et al. | |
| 2005/0143956 | A1 | 6/2005 | Long et al. | |
| 2005/0216241 | A1 | 9/2005 | Entin et al. | |
| 2005/0234745 | A1* | 10/2005 | Schoenberg | 705/3 |
| 2006/0143688 | A1* | 6/2006 | Futoransky et al. | 726/1 |
| 2007/0011330 | A1 | 1/2007 | Dinker et al. | |
| 2008/0116285 | A1* | 5/2008 | Shoemaker | 235/493 |
| 2008/0134347 | A1* | 6/2008 | Goyal et al. | 726/29 |
| 2009/0254355 | A1 | 10/2009 | Chou et al. | |
| 2011/0258123 | A1* | 10/2011 | Dawkins et al. | 705/75 |
| 2011/0307714 | A1* | 12/2011 | Comrie et al. | 713/189 |

OTHER PUBLICATIONS

PCI Data Storage Do's and Don'ts, Oct. 2008, PCI Security Standards Council LLC, pp. 1-2, retrieved from https://www.pcisecuritystandards.org/pdfs/pci_fs_data_storage.pdf.*

(Continued)

*Primary Examiner* — Jeffrey Pwu
*Assistant Examiner* — Michael D Anderson
(74) *Attorney, Agent, or Firm* — Davis Wright Tremaine LLP

(57) ABSTRACT

In some implementations, tokens that are representative of sensitive data may be used in place of the sensitive data to maintain the security of the sensitive data. For example, data may be separated into sensitive data and nonsensitive data, and at least the sensitive data is securely delivered to a data storage service. The data storage service generates a token that is representative of the sensitive data and stores the sensitive data as secure data. The data storage service may deliver the token to an entity that also receives the nonsensitive data, and the entity may use the token in place of the sensitive data. In some implementations, different tokens are generated each time the same piece of sensitive data is submitted for storage as secure data. Further, in some implementations, access policies define authorizations regarding which entities are able to resolve a token to access the actual sensitive data.

19 Claims, 12 Drawing Sheets

(56) References Cited

OTHER PUBLICATIONS

Non-Final Office Action for U.S. Appl. No. 13/168,747, mailed on Dec. 7, 2012, Alexandre Karpov et al., "Monitoring Services and Service Consumers", 5 pages.

Office action for U.S. Appl. No. 13/168,747, mailed on May 17, 2013, Karpov et al., "Monitoring Services and Service Consumers", 6 pages.

Office Action for U.S. Appl. No. 13/162,343, mailed on Mar. 18, 2014, Jonathan Kozolchyk, "Securing Services and Intra-Service Communications", 15 pages.

* cited by examiner

TOKEN-BASED SECURE DATA MANAGEMENT

BACKGROUND

Some types of businesses or other enterprises may receive or generate data that may be private, secret, confidential, proprietary, or that is otherwise sensitive, such that the data should be maintained in a secure manner. Further, sensitive data is often managed and shared by internal services within an enterprise during the performance of enterprise operations. Because internal services are typically provided within an enterprise's own network, intranet, or the like, interactions are often assumed to be secure. In addition, users of internal services may be able to access enterprise data that would never be exposed publicly, such as customer information, proprietary information, financial information, and the like. Accordingly, some enterprises may have safeguards that limit access of internal users and applications to sensitive data. However, enforcing these safeguards may interfere with the legitimate need for access to certain information or services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Secure Data Storage

Figure 1A:
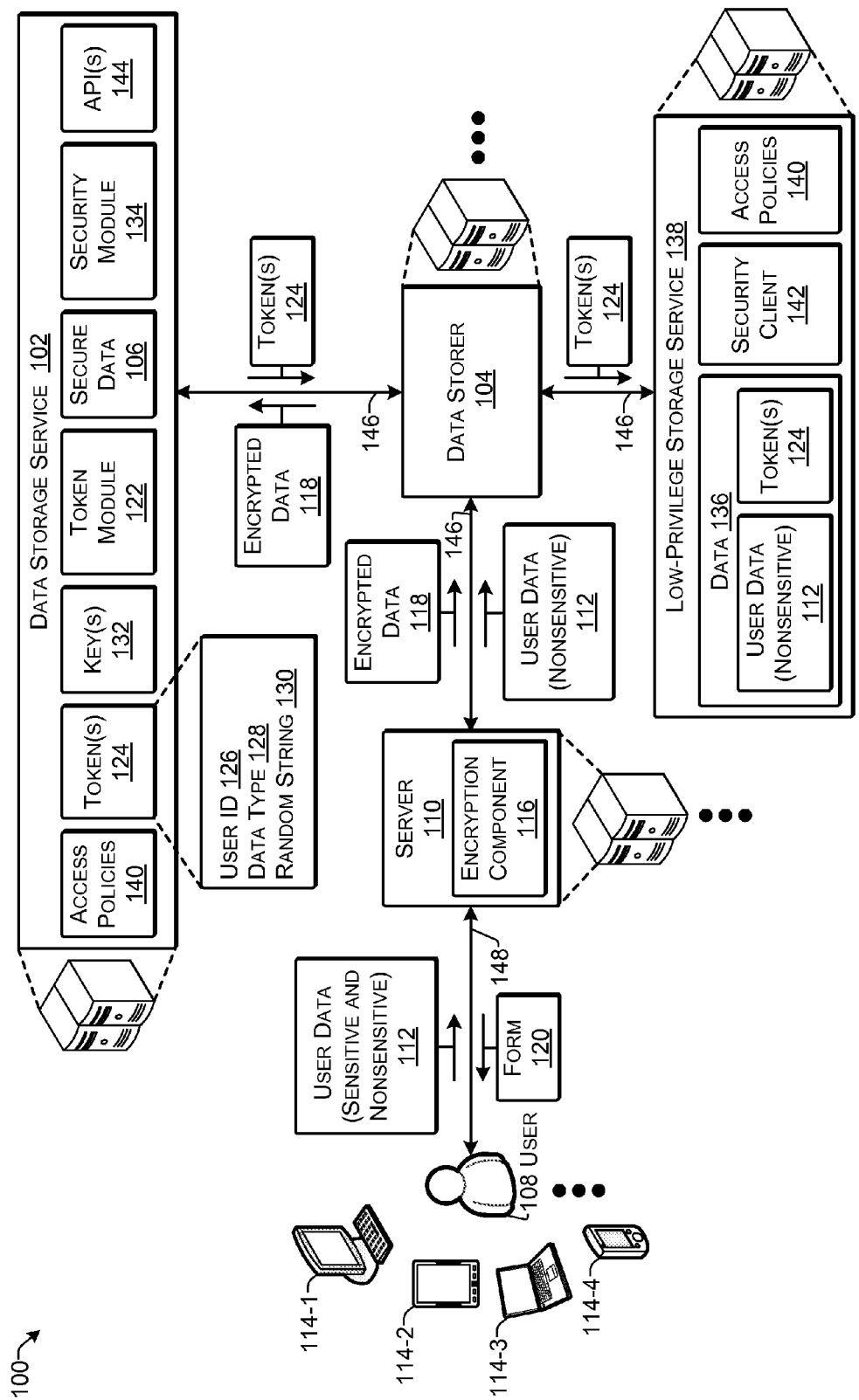
FIGS. 1A-1C illustrate an example architecture of a system for securing data using tokens according to some implementations.

This disclosure includes techniques and arrangements for securing data. In some implementations, a data storage service receives sensitive data to be securely stored. The data to be securely stored may be delivered to the data storage service in an encrypted form, such as from a data storer, from an original source of the data, from an encryption source or the like. The data storage service may determine or may be provided with a data type for the data and an identifier (ID) associated with the data, such as a user ID corresponding to a particular user to which the data pertains, a transaction ID corresponding to a particular transaction, or the like. The data storage service generates a token for the data and provides the token to the data storer for use as a proxy for the actual data. In some implementations, the token may include a randomly generated number or character string. For example, in some implementations, the token may include the user ID, the data type and the character string.

Following generation of a token based on the received sensitive data, the token may be passed back to the data storer and used by the data storer in place of the actual sensitive data when the data is used by the data storer or requested by another entity within the enterprise. Thus, the sensitive data may remain securely stored, while the token that represents the data may be passed among various entities within the enterprise and applied to various uses, all with lower levels of access authorizations and security than would be required if the sensitive data itself were being shared.

When an entity has a legitimate need for the actual sensitive data, the entity may submit the token to the data storage service. The data storage service may check the authorization of the requesting entity based at least in part on access policies established for the particular entity. If the access policies indicate that the requesting entity is authorized to access the sensitive data, the data storage service may encrypt the sensitive data and provide the sensitive data to the requesting entity.

As an example, suppose a first entity receives user data from a user. The user data may include both sensitive data and nonsensitive data. The sensitive data may be stored in the secure data storage and the first entity receives a token representing the sensitive data. In some implementations, the sensitive data is separated from the nonsensitive data before reaching the first entity, and the sensitive data is passed directly to the data storage service. Accordingly, the sensitive data may bypass the first entity altogether, and the first entity receives only the token representing the sensitive data.

Next, suppose that a second entity (i.e., a data consumer) that has a legitimate need for the sensitive data of the user submits a request to the first entity (i.e., a data provider) to obtain the sensitive data. Rather than passing the sensitive data (which the first entity may not possess anyway), the first entity provides the token representing the sensitive data to the second entity. Accordingly, communications between the first entity and the second entity may be unsecured and the second entity may perform various functions as discussed below without actually resolving the token representing the sensitive data. Furthermore, when the second entity does actually require the sensitive data for performing a legitimate operation, the second entity may submit the token to the data storage service to obtain the actual sensitive data in a secure manner such as through encrypted delivery or the like.

Implementations herein include the ability to designate virtually any type of data for storage at the data storage service. Further, some implementations enable return of only partial data to particular data consumers based on determined authorization of the particular data consumer for access to particular information. Thus, if a token represents a certain quantity of information, different data consumers submitting the token to the data storage service will automatically receive different amounts or portions of the information depending on particular access policies established for each particular data consumer with respect to the particular type of data. For example, suppose that a data storer stores data that may include users' nine-digit postal codes. Accordingly, a low-privilege storage service may include for each user a token that represents the postal code that includes customer ID, data type (i.e., postal code) and a unique character string. A plurality of different data consumers may obtain tokens representing the postal codes from the low-privilege storage service. Based on the need for information predetermined for each data consumer, a first data consumer that returns the token to the data storage service may be provided with only the first five digits of the nine-digit postal code, while a second service consumer may be provided with the entire nine-digit postal code, and a third service consumer may receive no postal code information at all when the token is submitted to the data storage service. In some instances, all the service consumers may submit the same token using the same call (such as to the same application programming interface (API)), but may be provided different portions or different subsets of the same information based on their previously demonstrated need for the information, as may be established by the access policies checked by the data storage service prior to responding to each call.

Furthermore, in some implementations, entities that will handle data as a data provider (service provider) and/or a data consumer (service consumer) may be required to register in advance with a security service provided by the data storage service or by a separate security service. For example, each entity that provides data to other entities may register as a service provider, while each entity that consumes data provided by another entity may be required to register as a service consumer to receive particular types and amounts of data provided by a particular service provider. Prospective data consumers may apply to the security service to access data from a particular data provider. In some instances, the security service may collect information from prospective data consumers to determine whether to authorize access by the prospective data consumer. For example, the security service and/or the data provider may determine what types of data each particular data consumer should be able to access, whether the particular data consumer needs all of the particular data, or just a portion thereof, and the like. Following approval of the data consumer's application by the data provider of the registered service, the security service can implement access policies that include authorization information that defines the types and amounts of information that each data consumer is able to access, obtain or utilize from each data provider. In some implementations, the security service may be provided by the data storage service. In other implementations, the security service may be a separate entity and the data storage service is a data provider registered with the security service.

Some implementations herein are described in the environment of a user providing sensitive data to an enterprise, such as during a transaction, or the like. However, the implementations herein are not limited to the particular examples of user data, data obtained during transactions, or data generated by entities, and may be extended to other types, sources, or applications of private, confidential, secret or proprietary data, as will be apparent to those of skill in the art in light of the disclosure herein.

Example Architectures

FIG. 1A illustrates an example architecture of a system 100 that includes a data storage service 102 for securely storing data according to some implementations. In some implementations, the system 100 may be used for securely storing and managing data within a business, government entity, university, or other type of enterprise. The system 100 includes the data storage service 102 in communication with one or more data storers 104 that utilize the data storage service 102 to store secure data 106. Secure data 106 may be any type of data that is private, proprietary, secret, confidential, or that is otherwise sensitive or desired to be securely stored so that it may be accessed and/or obtained only by authorized entities (referred to herein as "sensitive data"). For example, virtually any type of data or information may be designated as sensitive data to be stored securely as the secure data 106 in the data storage service 102. In some implementations, the secure data 106 may be physically maintained on one or more storage devices (not shown in FIG. 1A) in a physically secure location and the secure data 106 may be accessible physically and virtually by only a limited number of authorized individuals.

In the illustrated example, one or more users 108, such as an external user (e.g., a customer, potential customer or other member of the public) an internal user (e.g., an employee or application of an enterprise), or other type of user, depending on the purpose of the system 100, may be in communication with a server 110. For example, the user 108 may communicate user data 112 to the data storer 104 through the server 110 using any of a variety of user devices such as personal computers or workstations 114-1, e-book readers and tablet devices 114-2, laptop computers and netbooks 114-3, cellular telephones and smart phones 114-4, or any other suitable communication devices. In this example, the user data 112 may include both a sensitive user data portion that is to be stored as secure data 106 and a nonsensitive user data portion for which secure data storage is not used. The server 110 may receive the user data 112 and may use an encryption component 116 to encrypt the sensitive portions of the user data 112 to generate encrypted data 118 for delivery to the data storage service 102. The nonsensitive portions of the user data 112 may be passed in the clear (i.e., without encryption), or may be separately encrypted for delivery to the data storer 104.

As one nonlimiting example, suppose that the data storer 104 is a retail website and the user 108 enters the user data 112 into a form 120 as part of a transaction, such as an online transaction. For example, the form 120 may be displayed to the user 108 by one of the user devices 114, such as through a web browser or application. Suppose that the form 120 collects some private or sensitive data, such as credit card information, Social Security number, driver's license number, nine digit postal code, telephone number, or other information that the data storer 104 or enterprise has determined should be protected or kept secure. In some implementations, the user data 112 may be transmitted from the user device 114 to the server 110 in a secure manner, such as using HTTPS (hypertext transfer protocol secure), SSL/TLS (secure sockets layer/transport layer security), a VPN (virtual private network), or other secure communication technology. Upon receipt of the user data 112 at the server 110, the encryption component 116 may encrypt at least the sensitive portion of the user data 112 that will be stored as secure data 106 and forward the encrypted data 118 to the data storer 104. As discussed additionally below, in some implementations, the data storer 104, the data storage service 102, or a separate security service (not shown in FIG. 1A) may determine in advance which data or types of data should be securely stored in the data storage service 102. For example, the form 120 may be configured to designate which portions of the user data 112 collected by the form 120 should be stored as secure data 106. As one nonlimiting example, the name of a form field that collects secure data may be prefixed with a string that indicates that the value entered into this field should be treated as secure data. Further, in some implementations, the server 110 may be a proxy that handles communications with one or more users 108 on behalf of the data storer 104. However, in other implementations, the server 110 may be operated by the data storer 104 and may also execute other services and perform other functions of the data storer 104.

As mentioned above, the server 110 receives the user data 112 and encrypts at least the sensitive portion thereof that is to be treated as secure data. The encrypted data 118 is passed to the data storer 104 and from there to the data storage service 102. Alternatively, the server 110 may pass the encrypted data 118 directly to the data storage service 102, bypassing the data storer 104, while passing the nonsensitive portion of the user data 112 to the data storer 104. In some implementations, the encryption component 116 may encrypt the sensitive portion of the user data 112 for decryption only by the data storage service 102, and may encrypt the nonsensitive portion of the user data 112 for decryption only by the data storer 104. Further, in other implementations, as mentioned above, the nonsensitive portion of the user data 112 may be sent to the data storer 104 in the clear.

The data storage service 102 may include a token module 122 that may generate and manage a plurality of tokens 124. In some implementations, such as in the illustrated example, each token 124 may be represented as a triple that includes a user ID 126, a data type 128, and a random string 130. For example, each user 108 may be assigned or may designate a unique user ID 126. In some implementations, the user ID 126 may correspond to an account, a name, an email address, or other identification information of the user 108. Alternatively, in some implementations, transaction IDs or other types of IDs may be assigned and used in place of user ID 126. The data type 128 identifies the type of data that a particular token represents, such as credit card number, telephone number, driver's license number, Social Security number, nine-digit zip code, street address, apartment access code, and so forth. As mentioned above, virtually any type of data may be stored as the secure data 106. In some implementations, the data type 128 may be indicated by the name of the form field of the form 120 into which the data was entered. Further, for each token 124, the token module 122 generates the random character string 130. In some implementations, a new random character string 130 is generated for each input of encrypted data, even if the information has been received previously for the particular user 108. For example, the random string may include a predetermined number of characters, such as 16, 20, 24, or 32 characters, etc. Additionally, in some implementations, the token 124 may merely include the data type 128 and the random character string 130, while in yet other implementations, the token 124 may include only the random character string 130.

The data storage service 102 receives the encrypted data 118 corresponding to the sensitive portion of the user data 112 that was submitted by the user 108, and decrypts the encrypted data 118 using one of the keys 132 possessed by the data storage service 102. For example, the data storage service 102 and the encryption component 116 may use an asymmetric key encryption arrangement in which the encryption component 116 uses a public key of the data storage service 102 to encrypt the encrypted data 118. The data storage service 102 uses one of keys 132 as a corresponding private key to decrypt the encrypted data 118. For example, the data storage service 102 may include a security module 134 to manage the decryption of the encrypted data 118. The token module 122 may generate one or more tokens 124 as described above from the decrypted encrypted data 118. Following generation of the one or more tokens 124, the security module 134 may store the sensitive portion of the user data 112 obtained from the encrypted data 118 as the secure data 106. In some implementations, the secure data 106 may be encrypted before or during storing of the secure data 106 by the data storage service 102. Furthermore, a pointer to the newly stored secure data 106 may be correlated with the corresponding newly generated token(s) 124.

In addition, in some implementations, one or more pieces of the secure data 106 may have a time to live (TTL) assigned, which designates a lifespan of the data. For example, certain data types may automatically have a specified TTL assigned to them. When the TTL has expired, the security module 134 may delete the corresponding piece of secure data 106 from the data storage service 102. Furthermore, when a piece of secure data 106 is deleted from the data storage service 102, in some implementations, the security module 134 may send instructions to one or more other entities in the system that maintain a token 124 corresponding to the deleted piece of secure data 106 to instruct the one or more other entities to delete the particular token 124 corresponding to the deleted piece of secure data 106.

Following the generation of the one or more tokens 124 from the encrypted data 118, the one or more tokens 124 representing the encrypted data 118 (i.e., representing the sensitive portion of the user data 112) are passed to the data storer 104. The data storer 104 may then treat the one or more tokens 124 in the same manner as it would the actual sensitive portion of the user data 112. For example, the data storer 104 may store the one or more tokens 124 along with the nonsensitive portion of the user data 112 as data 136 in a low-privilege storage service 138. Accordingly, the one or more tokens 124 may be stored with the related nonsensitive portion of the user data 112 from the same user, same transaction, etc., as data 136. Alternatively, in some implementations, the data storer 104 may store the data 136 locally, may pass the data 136 to another data consumer (not shown in FIG. 1A), or the like. Still alternatively, in some implementations, both the sensitive and the nonsensitive portions of the user data 112 may be encrypted by the server 110 and passed to the data storage service 102. The data storage service 102 may generate one or more tokens 124 for the sensitive portion of the user data 112 and pass the one or more tokens 124 and the nonsensitive portion of the user data 112 to the data storer 104. Other variations will also be apparent to those of skill in the art in view of the disclosure herein.

In some implementations, the system 100 may utilize access policies 140 that are applied when an entity attempts to access data in the system 100. In some implementations, the access policies 140 may be applied to control access to the nonsensitive portion of the user data 112, as well as to control access to the token(s) 124 and the secure data 106. In other implementations, the access policies 140 may be applied only by the data storage service 102 when an entity attempts to resolve a token to retrieve secure data 106. Thus, in some implementations, only the data storage service 102 maintains and applies the access policies 140, and the access policies 140 are only applied when a data consumer attempts to resolve a token 124 to obtain access to the secure data 106. As discussed additionally below, when the token 124 is received, the data storage service 102 checks the access policies 140 with respect to the requesting data consumer and provides the secure data 106 in accordance with the access policies 140. In these implementations, for example, the low-privilege storage service 138 may not include, or may not apply the access policies 140 at all when a data consumer makes a request for access to the data 136, such as a request to access the nonsensitive user data 112 and/or the token(s) 124.

In other implementations, any data provider in the system 100 may maintain and apply access policies 140. For example, as illustrated in FIG. 1A, the low-privilege storage service 138, as a data provider, may check the access policies 140 to determine authorizations of each data consumer that requests access to data 136 provided by the low-privilege storage service 138. In these implementations, the low-privilege storage service 138 may include an instance of a security client 142 that may apply the access policies 140 to incoming requests for access to the data 136. In some implementations, the access policies 140 may be determined by the security module 134 of the data storage service 102. Alternatively, the access policies 140 may be determined by a separate security service, as discussed in some implementations below.

In the illustrated example, the security module 134 may determine authorizations of each entity for accessing particular types of data stored in the system 100. For example, each entity that provides data to another entity may register their service with the security module 134. Any entity in the system 100 that desires, as a data consumer, to access the data provided by a particular data provider, may apply to the security module 134 for authorization to access some or all of the data provided by the particular data provider. Access policies 140 may then be established for the particular data consumer with respect to the data provided by the particular data provider. When a particular data consumer requests data from a particular data provider, the particular data provider may apply the access policies 140 to determine the type and amount of data that the particular data consumer is authorized to receive.

As an example, suppose the data storer 104 sends a request to the low-privilege storage service 138 to access the data 136 related to a particular user 108. Further, suppose that the access policies 140 specify that the data storer 104 may store the data 136 and also retrieve the data 136. Consequently, in response to the access request, the security client 142 at the low-privilege storage service 138 may review, based on the access polices 140, the authorization of the data storer 104, and provide the requested data 136 to the data storer 104 in accordance with the access policies 140. On the other hand, suppose that the data storer 104 sends a token 124 to the data storage service 102 to attempt to resolve the token 124 and obtain the corresponding secure data 106. Further, suppose that the access policies 140 indicate that the data storer 104 is not authorized to receive the secure data 106. In that situation, the request from the data storer 104 will be denied by the data storage service 102 based on the access policies 140. Additional details for establishing and applying the access policies 140 are described below.

Further, the low-privilege storage service 138 may include various other components, such as one or more service applications and one or more APIs (not shown in FIG. 1A) to enable the low-privilege storage service 138 to provide data as a data provider to data consumers, as discussed below. Similarly, the data storage service 102 may include one or more APIs 144 for responding to data requests, such as for providing tokens 124 in response to receiving encrypted data and for providing encrypted sensitive data in response to receiving a token.

The data storage service 102, data storer 104, server 110, and low-privilege storage service 138 may communicate with one another and other entities in the system 100 through one or more communication links 146. Furthermore, the server 110 may communicate with the one or more users 108 through one or more communication links 148. Each of these communication links 146, 148 may be the same communication link or different communication links. For example, the communications links 146, 148 may be any of a direct connection, a local area network (LAN), a wide area network (WAN), a virtual private network (VPN) or any combination thereof, and may include both wired and wireless communication technologies using any suitable protocols and communication techniques. In some implementations, the data storage service 102, data storer 104, server 110 and low-privilege storage service 138 may be located at a data center, server farm or other single physical location, while the one or more users 108 access the server 110 over the Internet. In other implementations, the data storage service 102, data storer 104, server 110, low-privilege storage service 138, and users 108 may be located in diverse locations that are physically remote from one another and the communication links 146, 148 may include the Internet or other long distance communication network.

Figure 1B:
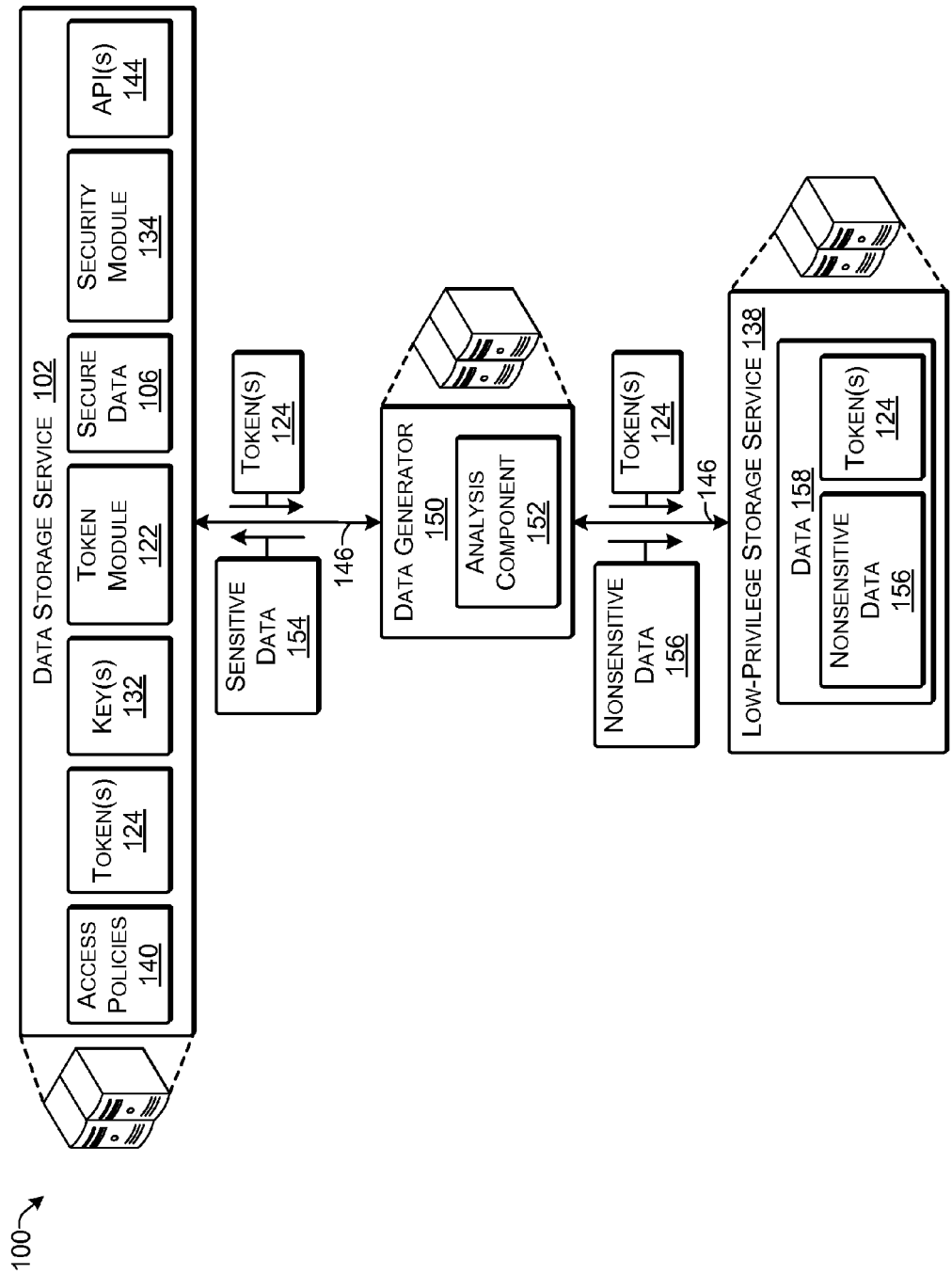

FIG. 1B illustrates an example of architecture that may be included in the system 100 in addition to or in place of the architecture of FIG. 1A. In the example of FIG. 1B, a data generator 150 includes an analysis component 152 that may generate data. In the illustrated example, the generated data includes sensitive data 154 and nonsensitive data 156. For example, the analysis component 152 may derive or otherwise generate the sensitive data 154 and nonsensitive data 156 from analysis of data pertaining to one or more users 108, transaction or order histories, operations of the enterprise, and/or various other sources. Alternatively, in some implementations the sensitive data 154 and nonsensitive data 156 may pertain to proprietary data, financial data, confidential data, or any other type data of which at least a portion is desired to be securely stored. In this example, the sensitive data 154 is generated and passed to the data storage service 102 for storage as the secure data 106. In some implementations, the sensitive data 154 may be encrypted by the data generator 150 prior to sending to the data storage service 102. In response to receiving the sensitive data 154, the data storage service 102 generates at least one token 124 corresponding to the received sensitive data 154. The data storage service 102 passes the token(s) 124 back to the data generator 150, which the stores the token(s) 124 with the nonsensitive data 156. For example, the data generator 150 may store the token(s) 124 and the nonsensitive 156 data locally, and may act as a data provider when a request for the data is received from a data consumer. Alternatively, in some implementations, as illustrated in FIG. 1B, the data generator 150 may store the nonsensitive data 156 and the one or more token(s) 124 as data 158 at the low-privilege storage service 138, which may act as the data provider. As yet another alternative, in some implementations, the data storage service 102 passes the token(s) 124 directly to the low-privilege storage service 138, bypassing the data generator 150. Numerous other configurations and interactions will be apparent to those of skill in the art in view of the disclosure herein, with the foregoing being just one non-limiting example provided for discussion purposes.

Figure 1C:
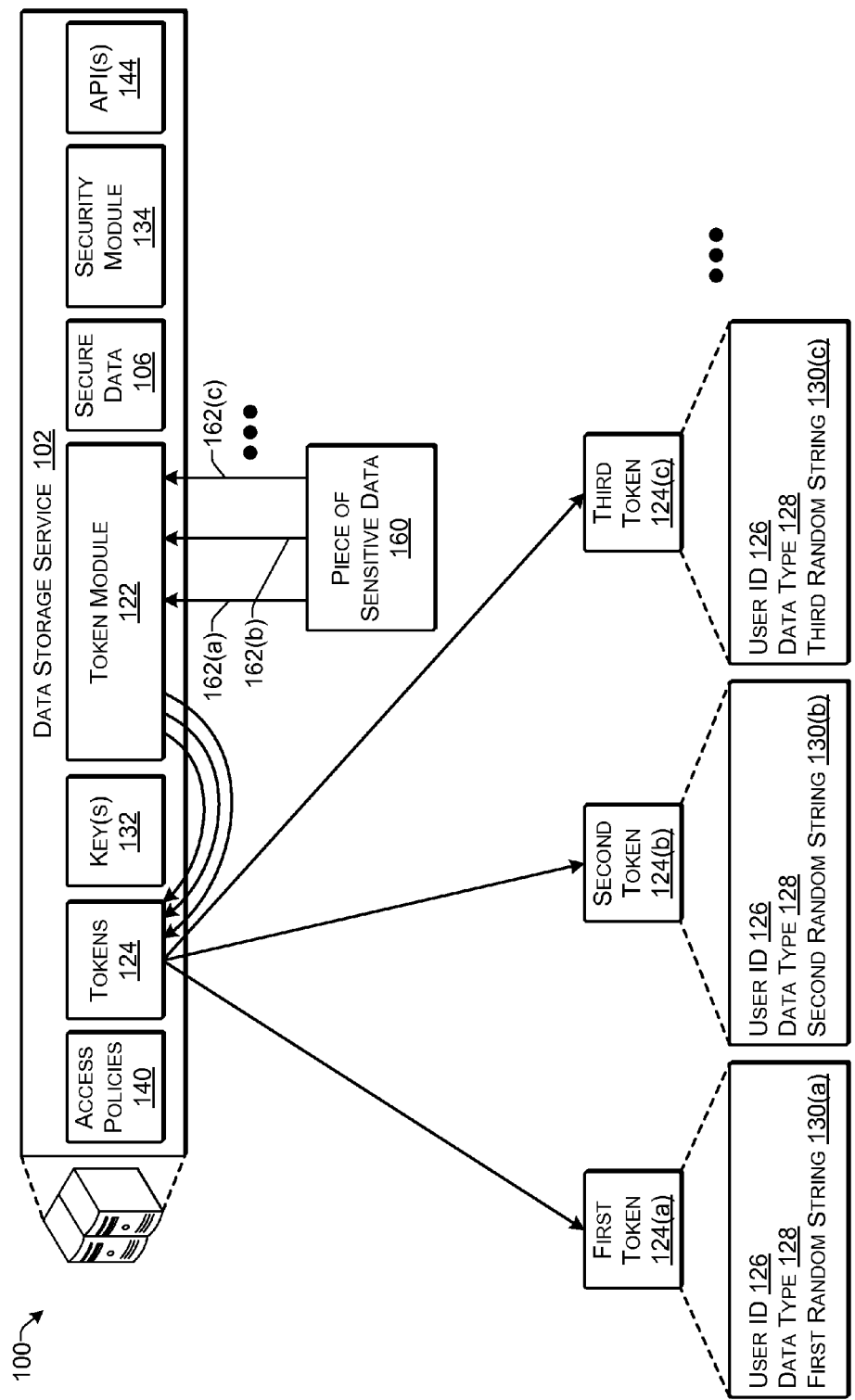

FIG. 1C illustrates additional examples of generating tokens 124 in the system 100. In these implementations, a different token 124 is generated each time the same piece of sensitive data 160 is submitted to the data storage service 102 for storage as secure data 106. For example, suppose that a matching or identical credit card number, Social Security number, nine-digit postal code, driver's license number, or other sensitive data of a particular user is submitted to the data storage service 102 multiple times, such as in multiple different transactions through the same entity or different entities. As indicated by arrow 162(a), the piece of sensitive data 160 is submitted to the data storage service 102 and, in response, the token module 122 generates a first token 124(a). The first token 124(a) may include a user ID 126 of the particular user, a data type of 128 of the piece of sensitive data 160, and a first random string 130(a).

Subsequently, suppose that the same piece of sensitive data 160 is submitted again to the data storage service 102, e.g., as part of a different transaction, from a different entity, or the like, as indicated by arrow 162(b). The token module 122 generates a second token 124(b), different from the first token 124(a), that may include the same user ID 126, the same data type 128 and a second random string 130(b) that is different from the first random string 130(a). Further, suppose that the same piece of sensitive data 160 is submitted again to the data storage service 102, e.g., as part of a different transaction, from a different entity, or the like, as indicated by arrow 162(c). The token module 122 generates a third token 124(c), different from the first token 124(a) and the second token 124(b), that may include the same user ID 126, the same data type 128, and a third random string 130(c) that is different from the first random string 130(a) and the second random string 130(b). Consequently, each time the piece of sensitive data 160 is submitted to the data storage service 102 for storage as secure data 106, a different token 124 having a different random string 130 is generated in response.

In some implementations, the piece of sensitive data 160 may be stored separately each time as secure data 106, thus resulting in three instances of secure data 106. In other implementations, the piece of sensitive data 160 may be stored as a single instance of the secure data 106 in response to the first submission 162(a), and the subsequently generated tokens (i.e., tokens 124(b) and 124(c)) may be correlated to one or more pointers to the single instance of the secure data 106. Other possible variations will also be apparent to those of skill in the art in view of the disclosure herein.

Figure 2:
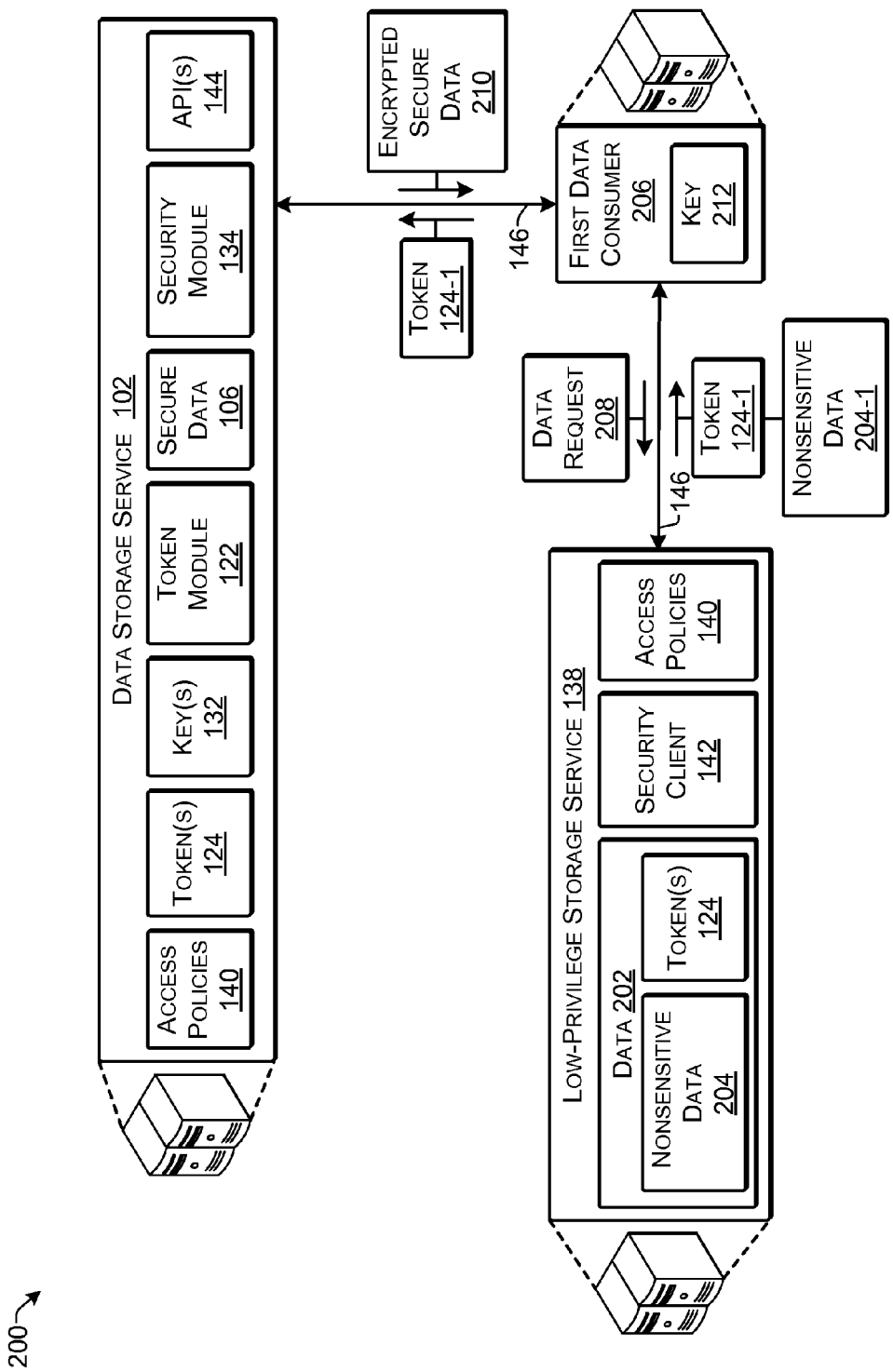
FIG. 2 illustrates an example architecture of a system that enables passing secure data using tokens according to some implementations.

FIG. 2 illustrates an example architecture of a system 200 based, at least in part, on the system 100 described above that includes the data storage service 102 according to some implementations. In the illustrated example, the low-privilege storage service 138 may include data 202, which may correspond to data for a plurality of the users 108, generated data generated by one or more entities, such as data generator 150, and/or other types of data, as discussed above. Thus, the data 202 may include nonsensitive data 204. The data 202 may also include a plurality of tokens 124 corresponding to sensitive data stored as the secure data 106 by the data storage service 102, as discussed above.

As an example, suppose that an entity, such as a first data consumer 206, submits a data request 208 to the low-privilege storage service 138 to obtain user information for a particular user 108. Furthermore, suppose that the data request 208 includes a request for user information that is included in the secure data 106, such as a credit card number, Social Security number, driver's license number, or other sensitive user data. The low-privilege storage service 138 may return a token 124-1 that represents the secure data 106 in place of the actual secure data 106 requested, as well as any requested nonsensitive data 204-1. In the implementations in which the low-privilege storage service 138 uses the access policies 140 for determining whether to provide data to the first data consumer 206, the security client 142 at the low-privilege storage service 138 may check the access policies 140 to determine authorizations of the first data consumer 206. When the access policies 140 indicate that the first data consumer 206 is authorized to receive the requested nonsensitive data 204-1 of the particular user and a token 124-1 that represents the requested sensitive data of the particular user, the low-privilege storage service 138 provides this information to the first data consumer 206.

The first data consumer 206 receives the token 124-1 and nonsensitive data 204-1 for the particular user, and then forwards the token 124-1 to the data storage service 102 to resolve the token 124-1. The security module 134 at the data storage service 102 receives the token 124-1 sent by the first data consumer 206 in the request, and determines from the access policies 140 whether the first data consumer 206 is authorized to receive secure data 106. If the access policies 140 indicate that the first data consumer 206 is authorized to receive the requested secure data 106 corresponding to the token 124-1, the security module may identify the secure data 106 corresponding to the token 124-1, such as based on a pointer, stored memory address, storage block, or the like, and may retrieve the corresponding secure data 106. Furthermore, the security module 134 may use one of keys 132 to encrypt the retrieved security data as encrypted secure data 210. For example, the data storage service 102 may include a public key as one of keys 132 corresponding to a private key 212 maintained by the first data consumer 206. The security module 134 may send the encrypted secure data 210 corresponding to the token 124-1 to the first data consumer 206. The first data consumer 206 may receive the encrypted secure data 210 and use the key 212 to decrypt and utilize the encrypted secure data 210.

As a further nonlimiting example, suppose that the encrypted secure data 210 provides a nine digit postal code of the particular user. Suppose that it is subsequently decided that the first data consumer 206 does not require the entire nine digit postal codes of users to perform its function and that the first five digits of the postal code are sufficient. Consequently, the access policies 140 may be updated to indicate that the first data consumer 206 only needs the first five digits of the postal code rather than the entire nine digits. Subsequently, when the first data consumer 206 next submits a token 124 to be resolved for obtaining the postal code of a user, the security module 134, when checking the access policies 140 for the first data consumer 206, determines that only the first five digits of the postal code should be returned. Consequently, the security module 134 returns only the first five digits of the postal code as the encrypted secure data 210, rather than the nine digits that were returned previous to the change in the access policies 140. Thus, even though the first data consumer 206 makes the same call to the data storage service 102, the data passed back is different due to the change in the access policies 140. Similar changes to access policies 140 may be performed for various other types of sensitive data, such as Social Security number, driver's license number, or the like. Furthermore, because only a portion of the secure data 106 is returned, in some implementations, the secure data may be returned in an unencrypted form rather than as encrypted secure data 210. Additionally, while the foregoing functions have been described as being performed by the security module 134, in other implementations, the functions may be performed by one or more of the APIs 144.

Figure 3:
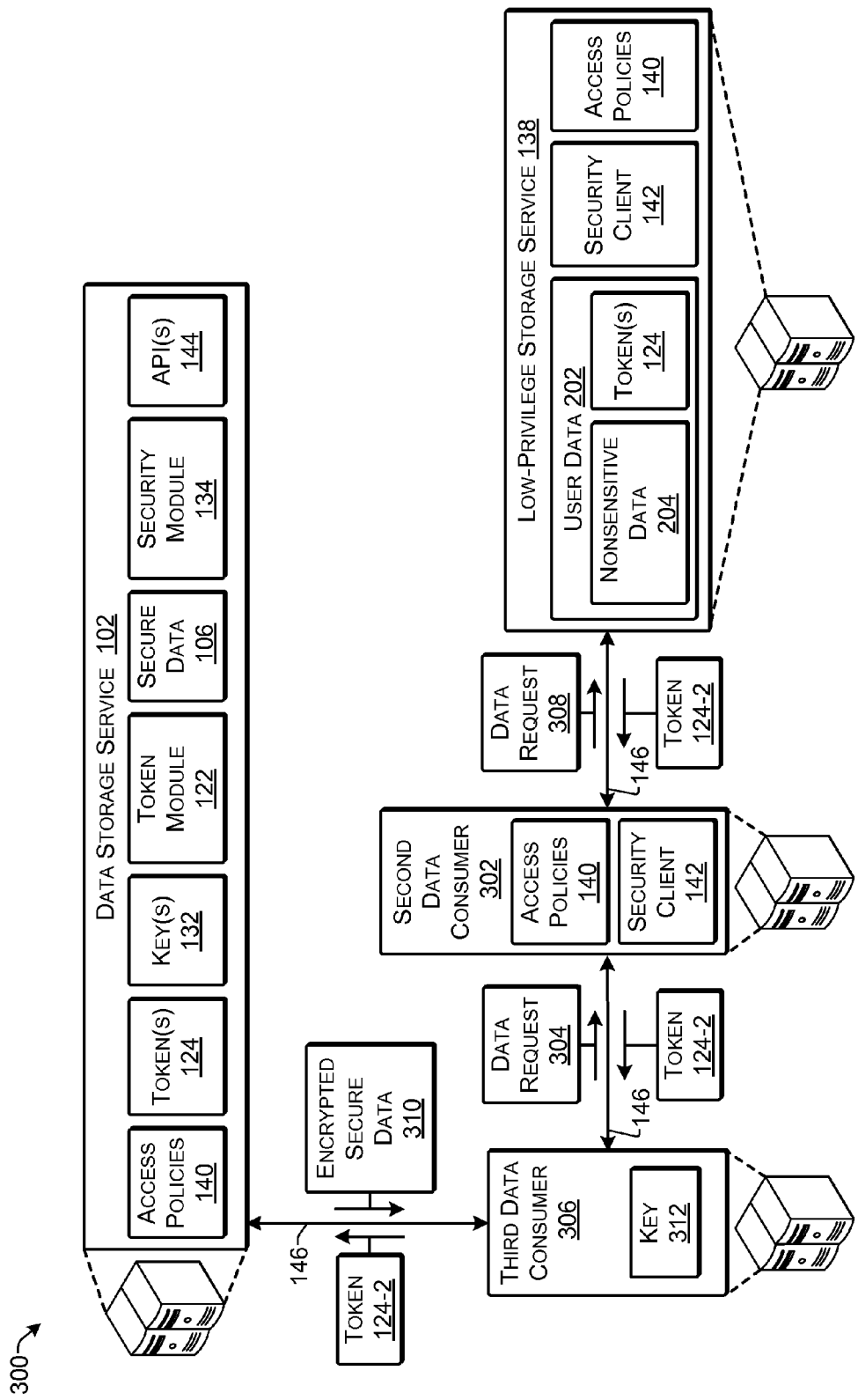
FIG. 3 illustrates an example architecture of a system that enables passing secure data using tokens according to some implementations.

FIG. 3 illustrates an example architecture of a system 300 based, at least in part, on the systems 100 and 200 described above that include the data storage service 102 according to some implementations. In the illustrated example, suppose that an entity, such as a second data consumer 302, receives a data request 304 from a third data consumer 306 for information related to a particular user. In some implementations, the second data consumer 302 may include an instance of the security client 142 that checks the access policies 140 to determine that the third data consumer 306 is authorized to receive the requested data. In order to respond to the data request 304 from the third data consumer 306, the second data consumer 302 sends a data request 308 to the low-privilege storage service 138 to request the information related to the particular user. In some implementations, an instance of the security client 142 at the low-privilege storage service 138 checks the access policies 140 to determine whether the second data consumer 302 is authorized to receive the requested data. Upon determining that the second data consumer 302 is authorized to receive the requested data, the low-privilege storage service 138 returns a token 124-2 that represents the requested information related to the particular user. The second data consumer 302 returns the token 124-2 to the third data consumer 306 with the response to the data request 304. Further, as mentioned above, in other implementations, the second data consumer 302 and the low-privilege storage service 138 do not include the access policies 140 and/or security clients 142, and thus, pass the token 124-2 without checking the access policies 140.

As one nonlimiting concrete example, suppose that the third data consumer 306 requires the driver's license number of the particular user for performing a particular function, such as authorizing a purchase. The second data consumer 302 obtains, from the low-privilege storage service 138, the token 124-2 that represents the driver's license number of the particular user. For example, the token 124-2 may include the user ID of the particular user, the data type, e.g., "DL" for driver's license, and a random character string previously generated by token module 122 when the token 124-2 was first created. The token 124-2 representing the driver's license number of the particular user is delivered by the second data consumer 302 to the third data consumer 306 as part of a service provided by the second data consumer 302.

Upon receiving the token 124-2, the third data consumer may submit the token 124-2 to the data storage service 102 to resolve the token 124-2 and obtain the drivers license number of the particular user. For example, the data storage service 102 receives the token 124-2 and locates the secure data 106 corresponding to the token 124-2, i.e., the drivers license number. The security module 134 uses an appropriate one of the keys 132 corresponding to the third data consumer 306 to encrypt the driver's license number to generate the encrypted secure data 310. The encrypted secure data 310 is sent to the third data consumer 306 where it is decrypted using an appropriate private key 312 of the third data consumer 306. The third data consumer 306 may then use the decrypted driver's license number for authorized purposes.

Furthermore, it may be noted that while the second data consumer is able to retrieve the token 124-2 from the low-privilege storage service 138 and pass the token 124-2 to the third data consumer 306, the second data consumer 302 may not have authorization to resolve the token 124-2 or obtain the corresponding secure data 106. For example, the access policies 140 may indicate that the second data consumer 302 is only authorized to retrieve and manipulate the token 124-2, rather than the actual secure data 106.

Figure 4:
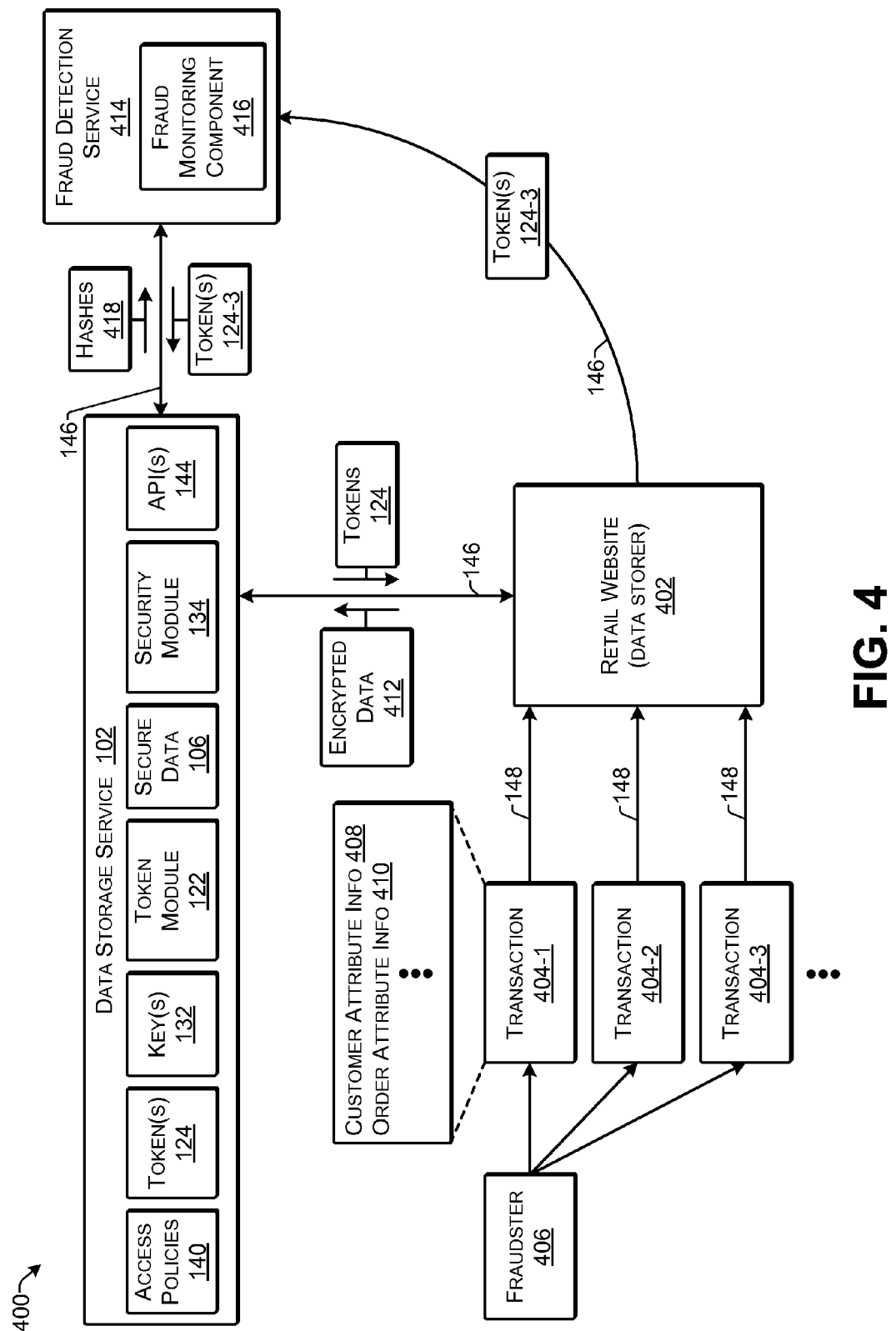
FIG. 4 illustrates an example architecture of a system that uses tokens and hashes for detecting fraud according to some implementations.

FIG. 4 illustrates an example architecture of a system 400 based, at least in part, on the system 100 described above that includes the data storage service 102 according to some implementations. In the illustrated example, suppose that a retail website 402 as a data storer or data provider receives a plurality of fraudulent transactions 404-1, 404-2, 404-3, . . . , from a fraudster 406. Further, suppose that each transaction 404 includes information such as customer attribute information 408 and order attribute information 410. In addition, suppose that the fraudster 406 uses an automated fraud technique to submit a large number of fraudulent transactions 404 that use different customer attribute information 408 and/or different order attribute information 410 for each fraudulent transaction, but that the automated technique uses at least some duplicate information 408, 410 for multiple transactions 404 because of difficulty in automatically changing some information for each transaction 404.

The transactions 404 are placed by the fraudster 406, and at least a portion of the customer attribute information 408 and/or the order attribute information 410 determined to be sensitive data for each transaction 404 may be encrypted either by the retail website 402 or by a proxy server 110, as described above with respect to FIG. 1A, to generate encrypted data 412. The encrypted data 412 may be delivered to the data storage service 102. In response to receiving the encrypted data 412, corresponding tokens 124 may be provided to the retail website 402 for each transaction 404.

Suppose that the retail website 402 discovers that the third transaction 404-3 is a fraudulent transaction, but has no knowledge of other fraudulent transactions. The retail website 402 may provide one or more tokens 124-3 corresponding to the transaction 404-3 to a fraud detection service 414. A fraud monitoring component 416 of the fraud detection service 414 may submit the one or more tokens 124-3 to the security module 134 on the data storage service 102. With the submission of the one or more tokens 124-3, the fraud monitoring component 416 may request that the security module 134 provide one-way hashes of the secure data 106 corresponding to the tokens 124-3 and further provide one-way hashes of the secure data 106 corresponding to all other tokens 124 of the same data type(s) created within a specified time period, such as the past day, past week, past month, etc. Nonlimiting examples of suitable hash algorithms that may be used by the security module 134 include SHA1, SHA-256 and MD5.

Upon receiving the requested hashes 418 of the secure data 106, the fraud monitoring component 416 may compare hashes of each requested data type with the hashes corresponding to the one or more tokens 124-3. Accordingly, from the hashes 418, the fraud monitoring component 416 can identify whether any other transactions received have used the same customer attribute information 408 and/or order attribute information 410, without having access to the actual content of the secure data 106. The fraud monitoring component 416 can identify other transactions that used at least some of the same information 408, 410 for further investigation. Thus, implementations herein enable a fraud detection service 414 to identify links between disparate secure data 106 without having to actually reveal the secure data 106 to the fraud detection service 414. Consequently, the secure data 106 remains secure while fraud monitoring and detection is enabled. Further, the secure data 106 may be similarly linked for other purposes without revealing the content of the secure data 106 to an entity performing the linking operation.

Figure 5:
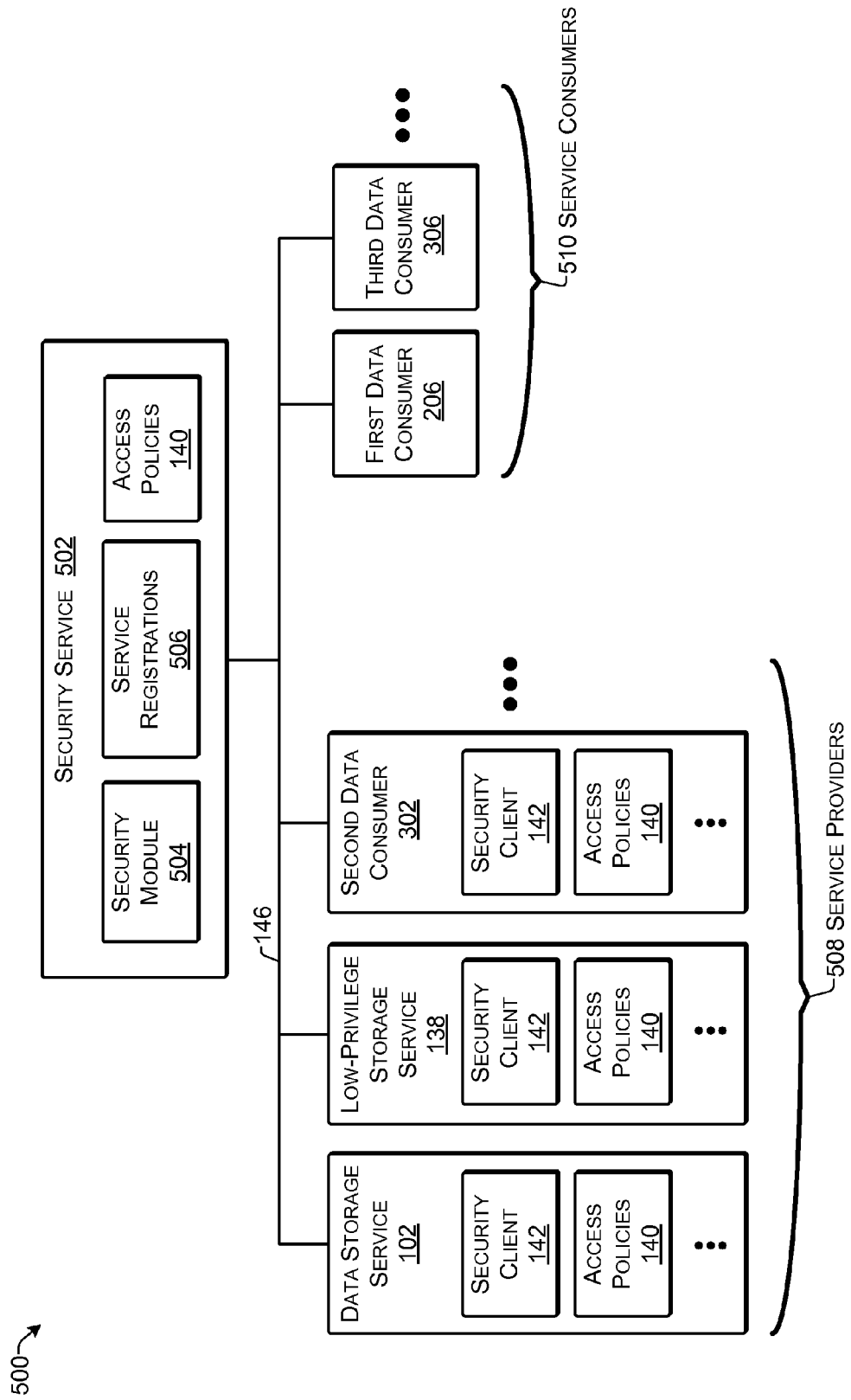
FIG. 5 illustrates an example architecture of a system for establishing access policies according to some implementations.

FIG. 5 illustrates an example architecture of a system 500 based, at least in part, on the system 100 described above that includes the data storage service 102 according to some implementations. In the illustrated example, a separate security service 502 is provided for establishing the access policies 140 for controlling access to data for the various entities in the system 500. In some implementations, the security service 502 may include a security module 504 for performing and controlling the operations of the security service 502. For example, the security module 504 may receive service registrations 506 from a plurality of service providers 508. The service providers 508 may include the data storage service 102, the low-privilege storage service 138, the second data consumer 302, and various other entities (not shown) in the system 500 that are configured to provide data and/or other services to one or more service consumers 510. In this example, service consumers 510 include the first data consumer 206, and the third data consumer 306. In addition, it should be noted that the second data consumer 302 may be considered the both a service provider 508 and a service consumer 510.

In some implementations, the security module 504 may receive registration requests from the service providers 508 for registering their services with the security service 502. Thus, the data storage service 102 may register its services (e.g., APIs 144) with the security service 502. Additionally, the security service 502 may receive applications for access to services from the service consumers 510. The security service 502 and/or each service provider 508 registering a service may determine access policies 140 for each service with respect to each service consumer 510. For example, each service consumer 510 may apply to the security service 502 for access to a particular service provided by one of the service providers 508. The security service 502 may forward the application to the corresponding service provider 508 to gain approval of the service provider 508, determine appropriate access policies and authorizations for each service consumer 510, and so forth. Following registration of a service, each service provider 508 may be provided with an instance of the security client 142, such as a runtime client, that monitors incoming requests from the service consumers 510, authenticates the requests from the service consumers 510, and determines that data provided to the service consumers is in accordance with the access policies 140 applicable to the particular service consumer 510. Further, the security client 142 may periodically synchronize the access policies 140 with the security service 502 to ensure that the access policies 140 are up to date. In some implementations, the security service 502 may be configured as and may operate in the same or in a similar manner to the security service described in U.S. patent application Ser. No. 13/162,343, filed Jun. 16, 2011, to the same inventors as herein, the entire disclosure of which is incorporated herein by reference. Additionally, in some implementations, as discussed above, the functionality of the security service 502 may be incorporated into the data storage service 102, such as into security module 134, thus eliminating the separate security service 502. Further, as mentioned above, in some instances, only the data storage service 102 may maintain or enforce the access policies 140.

Example Processes

Figure 6:
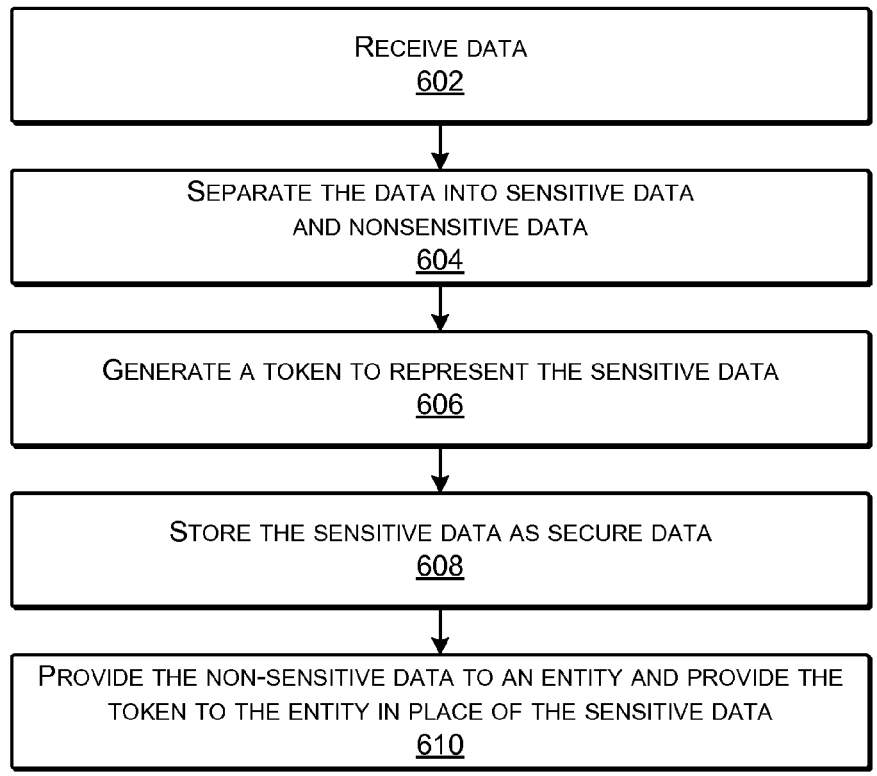
FIG. 6 is a flow diagram illustrating an example process for securing data using a token according to some implementations.
Figure 7:
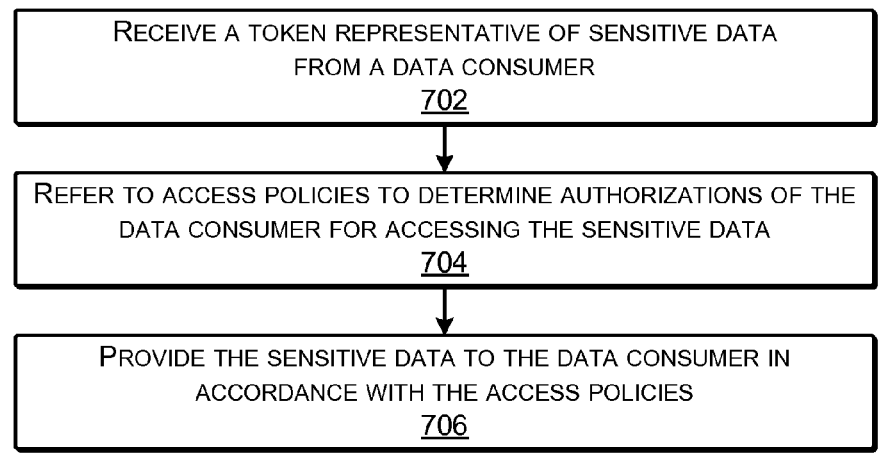
FIG. 7 is a flow diagram illustrating an example process for accessing secure data using a token according to some implementations.
Figure 8:
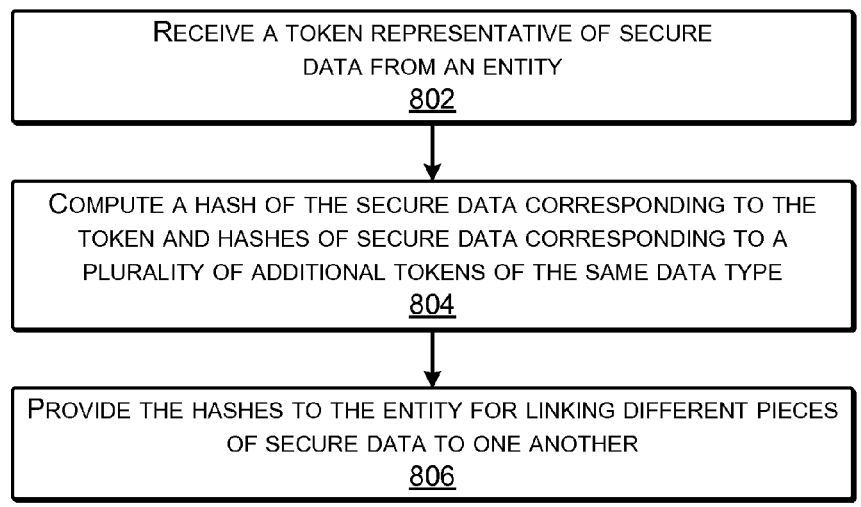
FIG. 8 is a flow diagram illustrating an example process for linking secure data using tokens without allowing access to the content of the secure data according to some implementations.

FIGS. 6-8 illustrate example processes for implementing the techniques described above for securing data and managing secure data. These processes are illustrated as a collection of operations in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures and environments described in the examples herein, although the processes may be implemented in a wide variety of other architectures, apparatuses or environments.

FIG. 6 is a flow diagram illustrating an example process 600 for securing data that may be executed by the data storage service 102 according to some implementations herein. Alternatively, in some implementations, the process 600 may be executed by the data storage service 102 and the server 110, or other combinations of entities, as discussed above.

At block 602, data that includes sensitive data is received. For example, in some implementations, a user may enter user data into a form in a web browser, or may otherwise provide user data to an enterprise, such as in part of an online transaction. In other implementations, an entity may generate or derive data that includes sensitive data. Additionally, in some implementations, the data may be proprietary information, confidential information, or the like.

At block 604, the data is separated into sensitive data and nonsensitive data. For example, in some implementations, the data may be separated based on designated fields in a form into which the data was entered. In other implementations, the data may be separated into sensitive data and nonsensitive data based on other considerations, such as may be specified by a security service, access policies, or the like. In some implementations, a server 110 that may be a proxy, a website host, or the like, separates the data into the sensitive data and nonsensitive data, while in other implementations, the separation may take place at the data storage service 102. Typically, it is desirable to encrypt at least the sensitive data as early as possible for secure delivery to the data storage service 102.

At block 606, the token module 122 of the data storage service 102 generates at least one token to represent the sensitive data. For example, the sensitive data may be identified according to data type and the token module may generate a separate token for each different data type of sensitive data received. In some implementations, the token includes at least a randomly generated character string. Further, in some implementations, the token may also include a data type. Further, in some implementations, the token may also include a user ID or transaction ID.

At block 608, the data storage service 102 stores the sensitive data as secure data. For example, the sensitive data may be stored in a physically secure location, and may be virtually secure in that only a limited number of authorized individuals or entities are permitted to access to the secure data.

At block 610, the nonsensitive data is provided to an entity and the token that represents the sensitive data is provided to the entity in place of the sensitive data. For example, as mentioned above, the nonsensitive data may be delivered directly to an entity that is handling the transaction with the user, while the sensitive data is delivered to the data storage service 102 and the data storage service delivers the token to the entity. Alternatively, in other implementations, the nonsensitive data and the sensitive data may both be delivered to the data storage service 102, and the data storage service 102 may deliver both the nonsensitive data and the sensitive data to the entity handling the transaction with the user. Other variations are also possible, as will be apparent to those of skill in the art in view of the disclosure herein.

FIG. 7 is a flow diagram illustrating an example process 700 that may be performed by the data storage system 102 for resolving a token to provide sensitive data according to some implementations.

At block 702, the data storage service 102 receives a token representative of sensitive data from a data consumer in a request to access the sensitive data. For example, the data consumer may submit the token to an API provided by the data storage service 102 to resolve the token and receive the sensitive data corresponding to the token.

At block 704, the data storage service refers to access policies to determine the authorizations of the particular data consumer for accessing the particular sensitive data corresponding to the submitted token. For example, as mentioned above, the data storage service may maintain access policies that define the authorizations of each data consumer authorized to access the secure data stored by the data storage service 102.

At block 706, the data storage service provides the sensitive data to the data consumer in accordance with the access policies. For example, if the data consumer is authorized to full access of the sensitive data, the data storage service 102 may encrypt the sensitive data using a public key corresponding to a private key maintained by the data consumer, and deliver the encrypted sensitive data to the data consumer. Alternatively, if the data consumer is authorized to access only a portion of the sensitive data, the data storage service may deliver the portion of the sensitive data to the data consumer. As an example, if the sensitive data is a number such as a credit card number, Social Security number, driver's license number, nine-digit postal code, or the like, the data consumer might be authorized to receive only several digits of the number. Of course, if the data consumer is not authorized to access any of the sensitive data, the data storage service 102 may return a message to that effect in response to receiving the token.

FIG. 8 is a flow diagram illustrating an example process 700 that may be performed by the data storage service 102 to enable linking of different pieces of secure data without allowing access to the content of the secure data.

At block 802, the data storage service 102 receives a token representative of a piece of secure data from an entity. For example, a fraud detection service or other entity may submit a token and request a hash of the secure data corresponding to the token, as well as hashes of secure data of a plurality of other tokens of the same data type.

At block 804, the data storage service 102 computes the hash of the content of the secure data corresponding to the token submitted by the entity and computes hashes of the content of the secure data corresponding to a plurality of other tokens of the same data type, such as tokens for data receive over a specified period of time. The data storage service may use any one of the hash algorithms specified above or another suitable one-way hash algorithm.

At block 806, the data storage service 102 provides the computed hashes to the entity to enable the entity to link different pieces of the secure data to one another without having to access the content of the secure data. For example, the entity, upon receiving the hashes may compare the hashes to identify any identical hashes, which are indicative of identical secure data content. In some cases, depending on the data type this may be indicative of fraud or other misconduct, and may warrant further investigation by the entity.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Example Computing Devices

Figure 9:
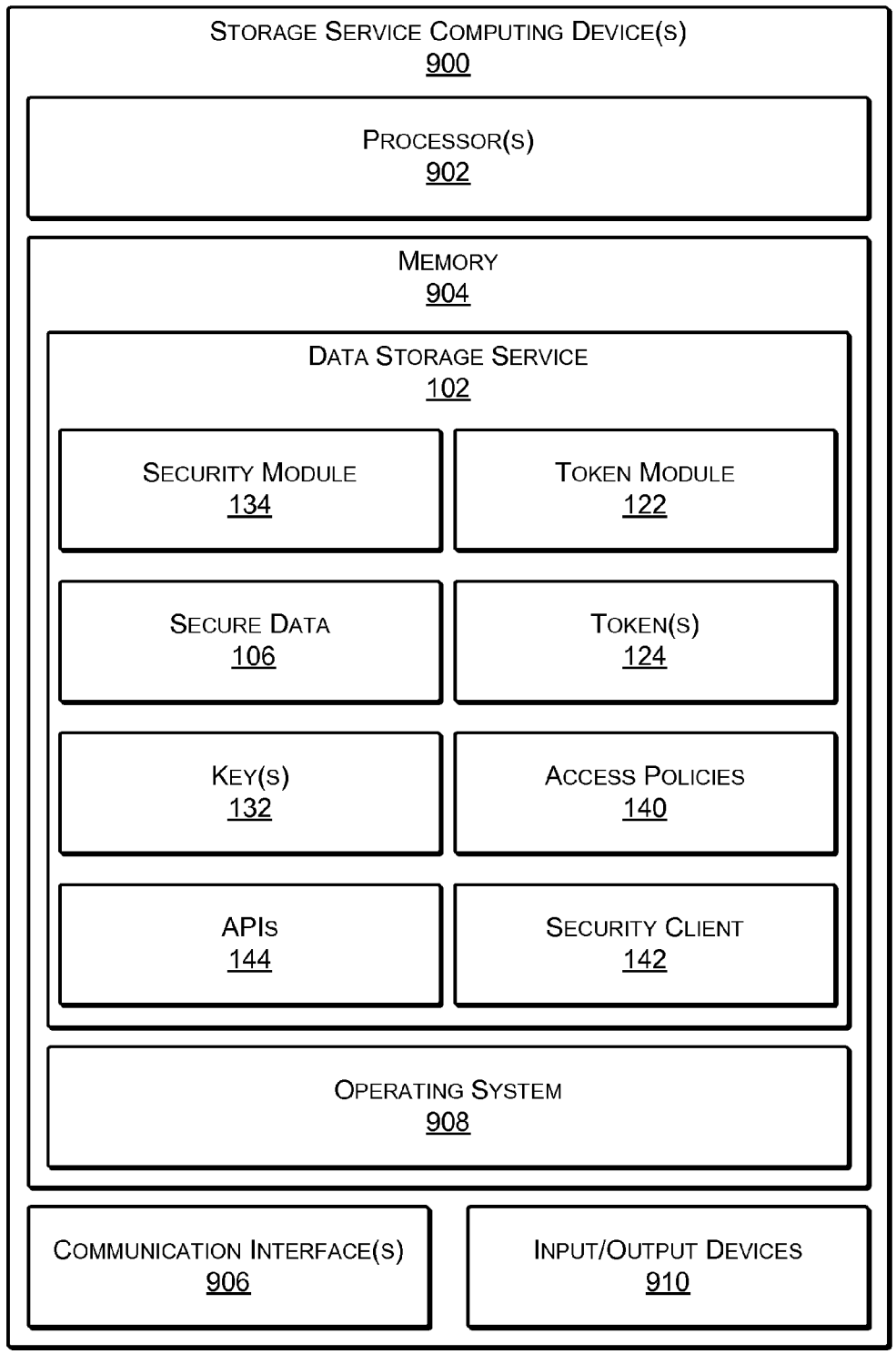
FIG. 9 illustrates select components of an example storage service computing device for providing the data storage service according to some implementations.

FIG. 9 illustrates select components of one or more storage service computing devices 900 that may be used to implement the functionality of the data storage service 102 according to some implementations. For example, the data storage service 102 may be hosted on one or more servers or other types of computing devices that may be embodied in any number of ways. For instance, in the case of a server, the data storage service 102 may be implemented on a single server, a cluster of servers, a server farm or data center, and so forth, although other computer architectures (e.g., a mainframe architecture) may also be used. Further, while the figures illustrate the components of the data storage service 102 as being present in a single location, it is to be appreciated that these components may be distributed across different computing devices and locations in any manner. Generally, the data storage service 102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

In the illustrated example, the storage service computing device 900 includes one or more processors 902, a memory 904, and one or more communication interfaces 906. The memory 904 may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, or any other medium which can be used to store the desired information and which can be accessed by a computing device. Depending on the configuration of the computing device 900, the memory 904 may be a type of computer readable storage media and may be a non-transitory storage media.

The memory 904 may be used to store any number of functional components that are executable by the processors 902. In many implementations, these functional components comprise instructions or programs that are executable by the processors 902 and that, when executed, implement operational logic for performing the actions attributed above to the data storage service 102. Functional components stored in the memory 904 may include the security module 134 and the token module 122, as described above, which may be executed on the processors 902 for implementing the various functions and features of the data storage service 102 described herein. Additional functional components stored in the memory 904 may include an operating system 908 for controlling and managing various functions of the storage service computing device 900. The memory 904 may also store the secure data 106, the tokens 124, the keys 132, the access policies 140, and the APIs 144. Furthermore, in the case that there is a separate security service 502, as discussed above with reference to FIG. 5, the memory 904 may include an instance of the security client 142. The storage service computing device 900 may also include many other logical, programmatic and physical components, of which those described above are merely examples that are related to the discussion herein.

The communication interface(s) 906 may include one or more interfaces and hardware components for enabling communication with various other devices, such as data provider computing devices, data consumer computing devices, and/or user devices over communication links 146, 148. For example, communication interface(s) 906 may facilitate communication through one or more of the Internet, cable networks, cellular networks, wireless networks (e.g., Wi-Fi, cellular) and wired networks. Various different approaches to implementations described herein can be implemented in various environments. For example, the communication links 146, 148 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

Data storage service computing device 900 may further be equipped with various input/output devices 910. Such devices may include a display, various user interface controls (e.g., buttons, joystick, keyboard, touch screen, etc.), audio speakers, connection ports and so forth.

Figure 10:
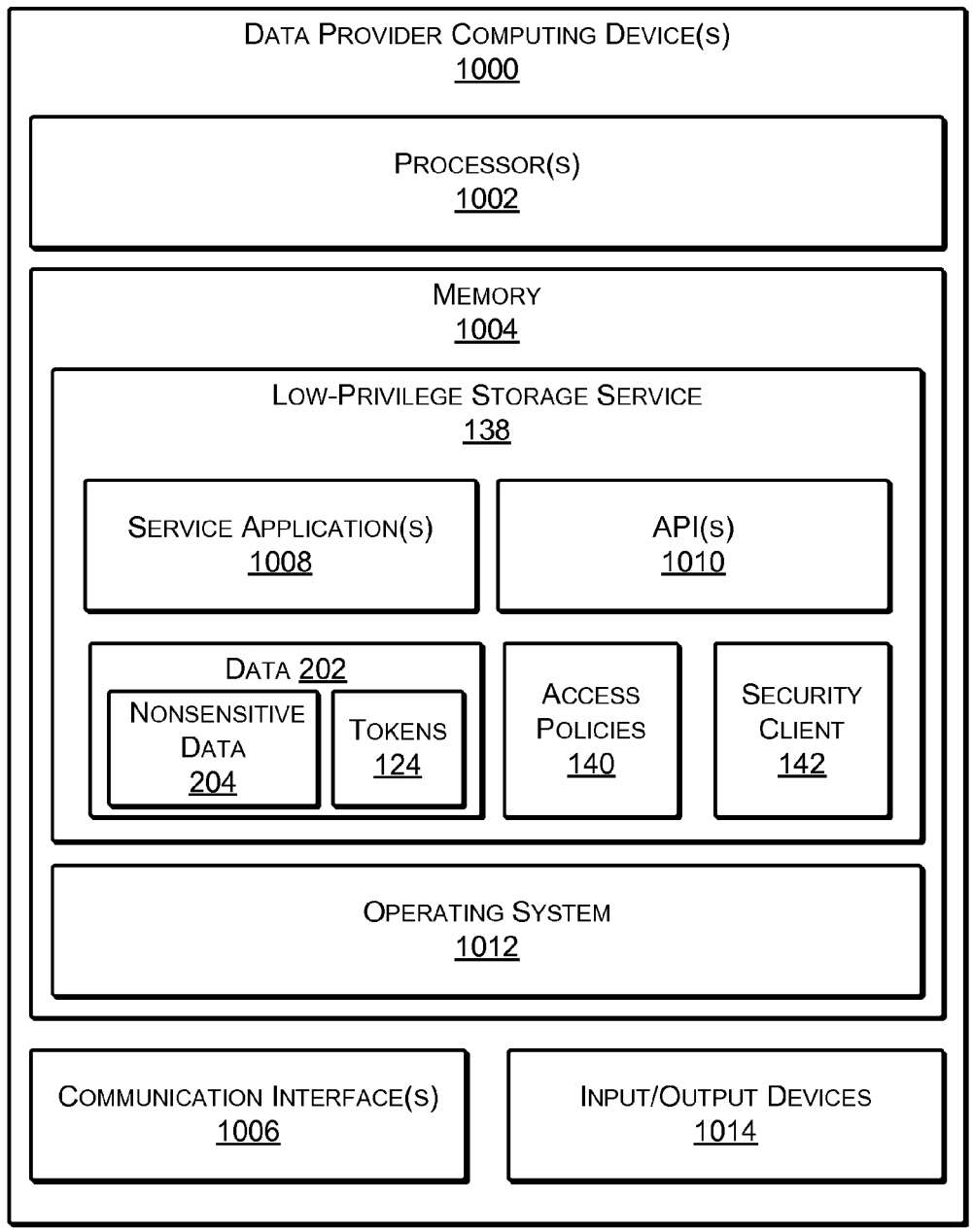
FIG. 10 illustrates select components of an example data provider computing device according to some implementations.

FIG. 10 illustrates select components of one or more service provider or data provider computing devices 1000 that may be used to implement the functionality of the service and/or data providers described herein according to some implementations. For example, the data provider computing device 1000 in this example may correspond to one or more computing devices that implement the low-privilege storage service 138. Further, other entities described herein, such as the data consumers 206, 302, 306, the data storer 104, the server 110, the retail website 402, the fraud detection service 414, the security service 502, and/or the user devices 114 may be implemented with similar hardware and configurations, while containing different functional components. In the illustrated example, the data provider computing device 1000 includes one or more processors 1002, a memory 1004 and one or more communication interfaces 1006. The processors 1002 and the memory 1004 may be any of the types of processors and memory described above with respect to processors 902 and memory 904, respectively.

The memory 1004 may be used to store any number of functional components that are executable on the processors 1002. In many implementations, these functional components comprise instructions or programs that are executable by the processors 1002 and that implement operational logic for performing the actions attributed above to the data providers. In addition, the memory 1004 may store various types of data that are referenced by the executable components.

The memory 1004 may store one or more service application(s) 1008 and one or more APIs 1010, which may be executed on the processors 1002 to provide data or other services, as discussed above. For example, the APIs 1010 may be called to provide, to authorized data consumers, requested data 202, such as nonsensitive data 204 and/or tokens 124. In some implementations, the memory 1004 may also store the access policies 140 as described above. Further, in some implementations, an instance of the security client 142 may be included for enforcing the access policies 140. Memory 1004 may also store an operating system 1012 that may manage and coordinate the various functions of the data provider computing device 1000.

The communication interface(s) 1006 may include one or more interfaces and hardware components for enabling communication with various other devices, such as the storage service computing devices, data consumer computing devices, and/or user devices over communication links 146, 148. For example, communication interface(s) 1006 may facilitate communication through one or more of the Internet, cable networks, cellular networks, wireless networks (e.g., Wi-Fi, cellular) and wired networks.

The service provider computing device 1000 may further be equipped with various input/output devices 1014. Such devices may include a display and various user interface controls (e.g., buttons, joystick, keyboard, touch screen, etc.), audio speakers, connection ports and so forth.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method comprising:
receiving, by one or more computing devices, encrypted user data that includes sensitive user data and related nonsensitive user data related to a transaction;
decrypting, by at least one of the one or more computing devices, the encrypted user data;
generating, by at least one of the one or more computing devices, a token for the sensitive user data, the token including a description of a data type of the sensitive user data and a randomly generated string;
storing, with a first data storage service by at least one of the one or more computing devices, the sensitive user data;
storing, with a second data storage service by at least one or more computing devices, the token with the related nonsensitive data;
providing, to a first entity by at least one of the one or more computing devices, the token and the related nonsensitive data, the token provided in place of the sensitive user data;
receiving, by at least one of the one or more computing devices, a request for the sensitive user data from a second entity, wherein the request includes the token previously provided to the first entity and subsequently provided to the second entity by the first;
determining by at least one of the one or more computing devices, an authorization of the second entity to access the sensitive user data based on access policies for the second entity; and
providing, by at least one of the one or more computing devices, the sensitive user data to the second entity in accordance with the access policies for the second entity;

wherein:
the access policies for the second entity specify that the second entity is authorized to receive only a portion of the sensitive user data; and
providing the sensitive user data to the second entity further comprises providing only the portion of the sensitive user data specified by the access policies for the second entity.

2. The method as recited in claim 1, wherein the sensitive user data is not provided by at least one of the one or more computing devices to the first entity.

3. The method as recited in claim 1, further comprising:
assigning a time to live to the sensitive user data;
deleting the sensitive user data following expiration of the time to live; and
as a result of deleting the sensitive user data, sending an instruction to the first entity to delete the token corresponding to the sensitive user data.

4. The method as recited in claim 1, wherein the token further includes an identifier (ID), the ID corresponding to at least one of:
a user ID; or
a transaction ID.

5. The method as recited in claim 1, further comprising:
receiving a request for the sensitive user data from a third entity, wherein the request includes the token provided to the first; and
providing a portion of the sensitive user data to the third entity in accordance with access policies for the third entity, the portion of the sensitive user data provided to the third entity being a different amount of the sensitive user data than an amount of the sensitive user data provided to the second entity.

6. A method comprising:
receiving, by one or more computing devices sensitive data and related nonsenstive data, a first time, wherein the sensitive data and related nonsensitive data are related to a transaction;
generating, by at least one of the one or more computing devices, a first token for the sensitive data, the first token including a description of a data type of the sensitive data and a first randomly generated string;
storing, by at least one of the one or more computing devices, the sensitive data as secure data;
providing, by at least one of the one or more computing devices, the related nonsensitive data and the first token in place of the sensitive data to an entity authorized to receive the related nonsensitive data for the transaction;
receiving, by at least one of the one or more computing devices, the sensitive data a second time;
generating, by at least one of the one or more computing devices, a second token for the sensitive data, the second token including a second randomly generated string that is different than the first randomly generated string associated with the first token;
receiving, by at least one of the one or more computing devices, a demand from one or more data consumers desiring to access the sensitive data and the nonsensitive data; and
establishing, by at least one of the one or more computing devices, access policies defining authorizations of each of the one or more data consumers to access the sensitive data and the nonsensitive data;
wherein the access policies specify that different data consumers are provided different amounts of the sensitive data in response to calls received using a same token.

7. The method as recited in claim 6, further comprising:
receiving, by at least one of the one or more computing devices, a request from another entity to generate a hash for secure data associated with the first token and for secure data associated with a plurality of additional tokens of a same data type generated for other transactions within a specified period of time; and
providing, by at least one of the one or more computing devices, the hash for the secure data associated with the first token and the hashes for secure data associated with the plurality of additional tokens to the other entity to enable linking different pieces of the secure data stored without revealing content of the secure data.

8. The method as recited in claim 7, wherein two matching hashes indicate that two corresponding pieces of the secure data are linked.

9. The method as recited in claim 6, wherein the sensitive data is distinguished from the nonsensitive data based, at least in part, on indications related to fields of a form received from a user to provide the sensitive data and the nonsensitive data.

10. The method as recited in claim 6, wherein receiving the sensitive data related to the transaction further comprises receiving the sensitive data from a server that separates the sensitive data from the nonsensitive data, the received sensitive data having been encrypted by the server to prevent other entities from accessing the sensitive data.

11. The method as recited in claim 6, further comprising:
receiving, by at least one of the one or more computing devices, the first token from a data consumer as a request for the sensitive data;
determining, by at least one of the one or more computing devices, whether the data consumer is authorized to receive the sensitive data based at least in part on access policies established for the data consumer;
encrypting the sensitive data; and
providing the encrypted sensitive data to the data consumer in response to the request.

12. The method as recited in claim 11, further comprising:
receiving, by at least one of the one or more computing devices, an update to the access policies;
receiving, by at least one of the one or more computing devices, the first token from the data consumer as a request for the sensitive data; and
providing, by at least one of the one or more computing devices, only a portion of the sensitive data to the data consumer based on the update to the access policies.

13. The method as recited in claim 6, further comprising:
assigning a time to live to the sensitive data; and
deleting the sensitive data following expiration of the time to live.

14. One or more non-transitory computer-readable media storing computer-executable instructions that, when executed, cause one or more processors to perform operations comprising:
receiving a first piece of sensitive data and nonsensitive data associated with the first piece of sensitive data;
generating a first token for the first piece of sensitive data, the first token including a randomly generated first string, and a description of a data type of the first piece of sensitive data;
storing the first piece of sensitive data as secure data;
providing the nonsensitive data associated with the first piece of sensitive data and the first token in place of the first piece of sensitive data to a first entity;
receiving, by a data storage service, a second piece of sensitive data that is same as the first piece of sensitive data;

generating a second token for the second piece of sensitive data, the second token including a randomly generated second string that is different from the first string, and a description of a data type of the second piece of sensitive data;

providing the second token in place of the second piece of sensitive data to a second entity that maintains nonsensitive data associated with the second piece of sensitive data;

receiving a demand from one or more data consumers desiring to access the sensitive data; and establishing access policies that allow different data consumers to be provided with different amounts of the sensitive data in response to demands received using a same token.

15. The one or more non-transitory computer-readable media as recited in claim 14, wherein the first entity and the second entity are a same entity.

16. The one or more non-transitory computer-readable media as recited in claim 14, wherein the first token and the second token further include a same data type as part of the respective first token and second token.

17. The one or more non-transitory computer-readable media as recited in claim 16, wherein the first token and the second token further include a same user identifier associated with a particular user as part of the respective first token and second token.

18. The one or more non-transitory computer-readable media as recited in claim 14, wherein the first piece of sensitive data is received by the first entity as part of a first transaction and the second piece of sensitive data is received by the second entity as part of a second transaction.

19. The one or more non-transitory computer-readable media as recited in claim 14, the operations further comprising storing the second piece of sensitive data as a separate instance of the secure data.

* * * * *